(12) United States Patent
Chen et al.

(10) Patent No.: US 12,637,006 B2
(45) Date of Patent: May 26, 2026

(54) EXTERIOR MIRROR ASSEMBLY WITH ACTUATOR

(71) Applicant: Chris Cam Industry Inc., Tainan City (TW)

(72) Inventors: Hung-Lung Chen, Tainan City (TW); Wen-Sen Wu, Tainan City (TW); Kai-I Teng, Tainan City (TW)

(73) Assignee: CHRIS CAM INDUSTRY INC., Tainan City (TW)

( * ) Notice: Subject to any disclaimer, the term of this patent is extended or adjusted under 35 U.S.C. 154(b) by 308 days.

(21) Appl. No.: 18/469,872

(22) Filed: Sep. 19, 2023

(65) Prior Publication Data

US 2025/0091512 A1 Mar. 20, 2025

(51) Int. Cl.
B60R 1/06 (2006.01)

(52) U.S. Cl.
CPC .................................. B60R 1/0612 (2013.01)

(58) Field of Classification Search
CPC ........ B60R 1/0612; B60R 1/072; B60R 1/074
See application file for complete search history.

(56) References Cited

U.S. PATENT DOCUMENTS

| | | | | |
|---|---|---|---|---|
| 4,787,761 | A | * 11/1988 | Tezuka | B41J 29/58 |
| | | | | 400/187 |
| 5,867,328 | A | * 2/1999 | Stapp | B60R 1/074 |
| | | | | 248/549 |
| 2008/0266688 | A1* | 10/2008 | Errando Smet | B60R 1/074 |
| | | | | 359/877 |
| 2017/0136950 | A1* | 5/2017 | Brouwer | B60R 1/072 |
| 2020/0223364 | A1* | 7/2020 | Peterson | B60R 1/074 |

* cited by examiner

*Primary Examiner* — James A Dudek
(74) *Attorney, Agent, or Firm* — Duane Morris LLP

(57) ABSTRACT

An exterior mirror assembly with an actuator is provided. The actuator comprises: a gear element, a driving unit and a limiting element. The driving unit is configured to impart a rotation of the gear element. The limiting element is adjacent to a circumference of the gear element. The gear element has a teeth portion with a first end and a second end and the teeth portion extends along the circumference of the gear element. The limiting element leans against the first end or the second end of the teeth portion when the driving unit drives the gear element to rotate by an angle.

13 Claims, 14 Drawing Sheets

EXTERIOR MIRROR ASSEMBLY WITH ACTUATOR

BACKGROUND

1. Field of the Disclosure

The instant disclosure relates to exterior rearview mirror assemblies and, more particularly, to an exterior rearview mirror assembly that is adjustable relative to the side of the vehicle to which it is mounted.

2. Description of Related Art

It is known to provide a vehicular exterior rearview mirror assembly that has a mirror head having a mirror casing that is adjustable relative to a mirror mounting portion at the side of the vehicle to which the mirror assembly is mounted. The mirror assembly may comprise a power-fold assembly where the mirror head is adjusted or pivoted relative to the vehicle via an actuator disposed at the mirror mounting portion and/or mirror head.

The common actuator is designed to use a disc in combination with positioning pins and springs to position the mirror head relative to the side of the vehicle. However, the disc and the positioning pins are vertically arranged with each other, and the bottom of the disc should have inclined sliding grooves that can be matched with the positioning pins. As a result, this configuration will increase the overall weight and thickness of the actuator.

SUMMARY

According to one example embodiment of the instant disclosure, an exterior rearview mirror assembly for a vehicle comprises a mounting portion mountable at a side of a vehicle, a mirror head portion adjustably mounted at said mounting portion; a reflective element at said mirror head portion; and an actuator operable to impart pivotal movement of said mirror head portion relative to said mounting portion. Further, the actuator comprises: a gear element, a driving unit and a limiting element. The gear element has a teeth portion and a missing teeth region. The driving unit is configured to drive the gear element to pivot the mirror head portion relative to the mounting portion. The limiting element is located to corresponding to the missing teeth region and configured to contact an end of the teeth portion when the mirror head portion pivots relative to the mounting portion at an angle.

According to another example embodiment of the instant disclosure, an actuator for an exterior rearview mirror assembly for a vehicle, comprises: a gear element, a driving unit and a limiting element. The driving unit is configured to impart a rotation of the gear element. The limiting element is adjacent to a circumference of the gear element. The gear element has a teeth portion with a first end and a second end and the teeth portion extends along the circumference of the gear element. The limiting element leans against the first end or the second end of the teeth portion when the driving unit drives the gear element to rotate by an angle.

According to another example embodiment of the instant disclosure, an actuator for an exterior rearview mirror assembly for a vehicle, comprises: a housing, a partly tooth missing gear element, a driving unit and a limiting element. The partly tooth missing gear element is received in the housing. The driving unit is configured to drive the partly tooth missing gear element to rotate. The limiting element is fixed to the housing and configured to prevent from the partly tooth missing gear element from rotating when the limiting element engages with the partly tooth missing gear.

In order to further understanding of the instant disclosure, the following embodiments are provided along with illustrations to facilitate appreciation of the instant disclosure; however, the appended drawings are merely provided for reference and illustration, and do not limit the scope of the instant disclosure.

DETAILED DESCRIPTION

Figure 1:
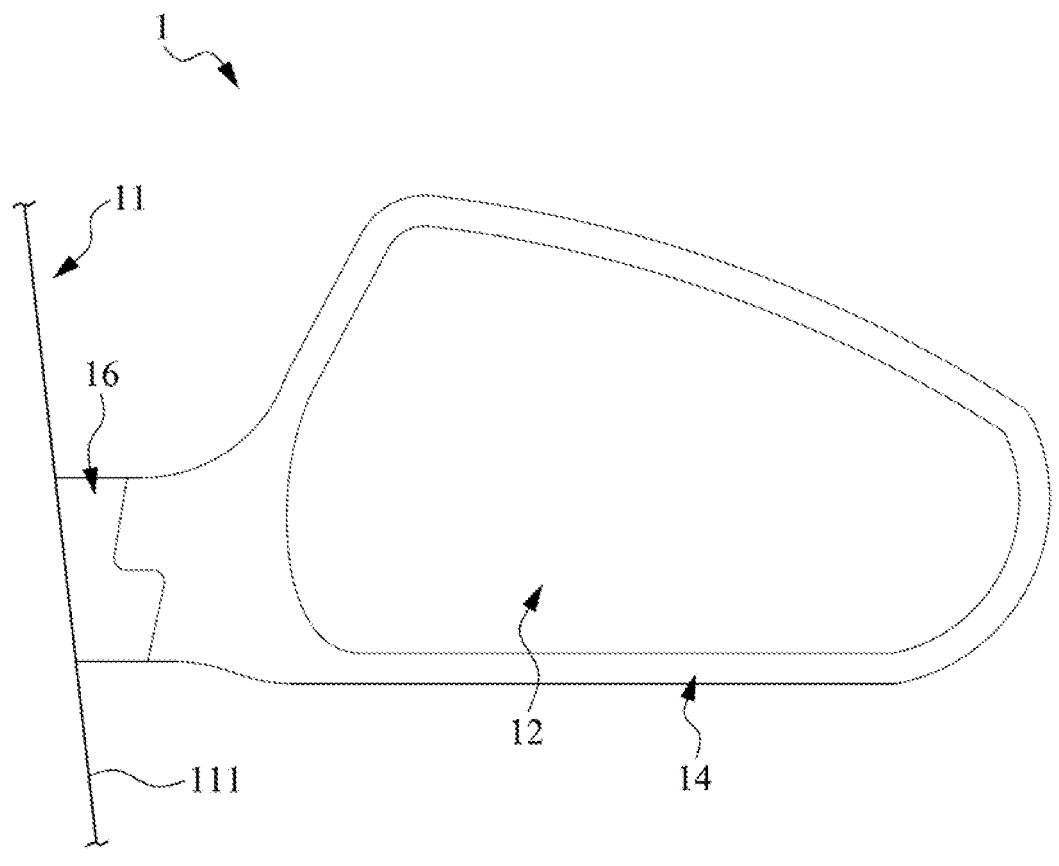
FIG. 1 is a schematic rear view of an exterior rearview mirror assembly in accordance with an embodiment of the instant disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the embodiments. Accordingly, the disclosure expressly should not be limited to such embodiments illustrating some possible non-limiting combination of features that may exist alone or in other combinations of features; the scope of the disclosure being defined by the claims appended hereto.

Present disclosure provides an actuator for an exterior rearview mirror assembly for a vehicle. The actuator may be equipped with a limiting element configured to align an actuating gear element. The actuating gear element may be connected to a mirror head and may be responsible for driving its rotation. When the limiting element engages with the actuating gear element, the actuating gear element stops rotating and the mirror head also stops rotating accordingly.

Figure 2:
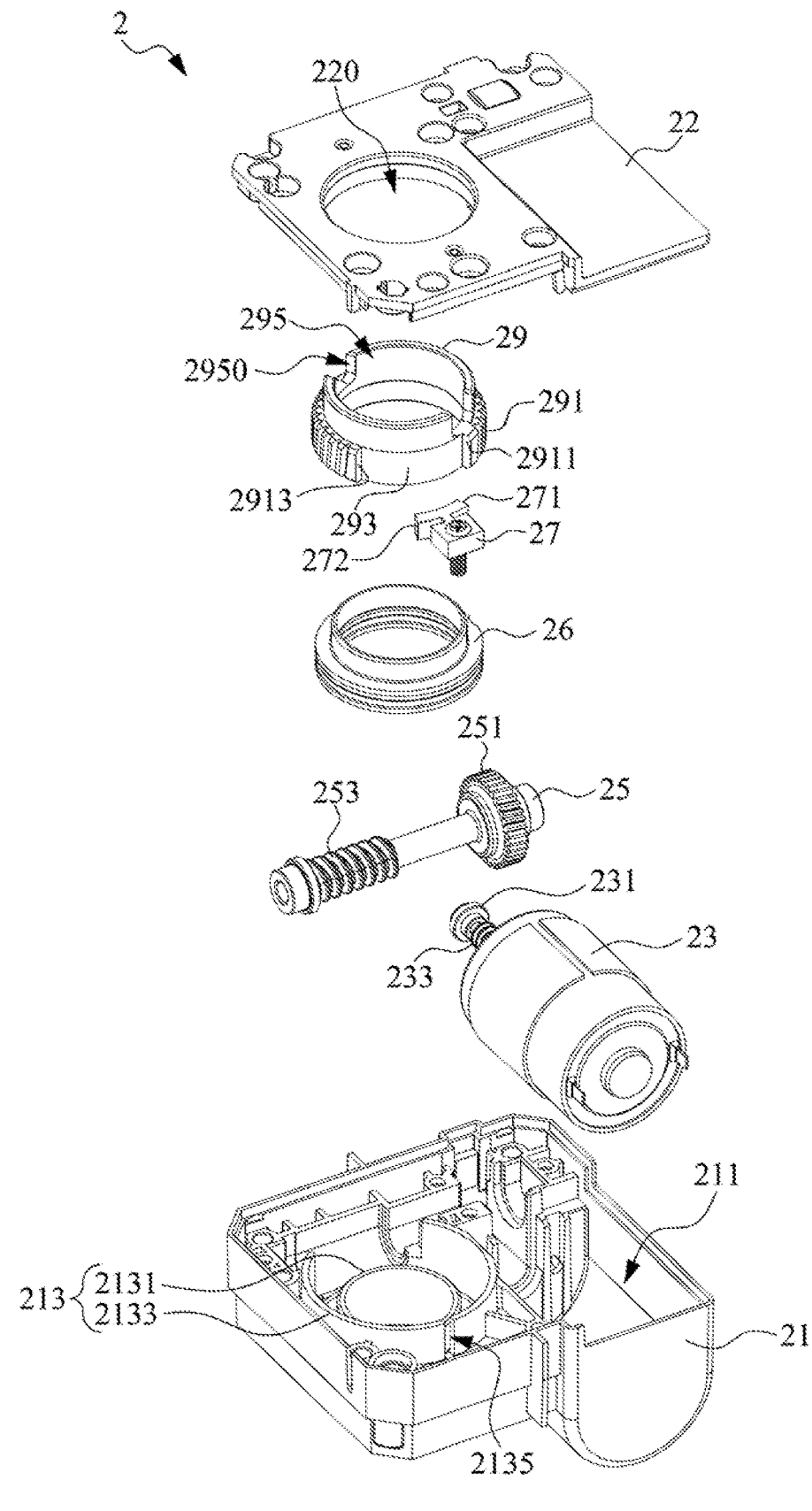
FIG. 2 is an exploded perspective view of an actuator of an exterior rearview mirror assembly in accordance with an embodiment of the instant disclosure.
Figure 3:
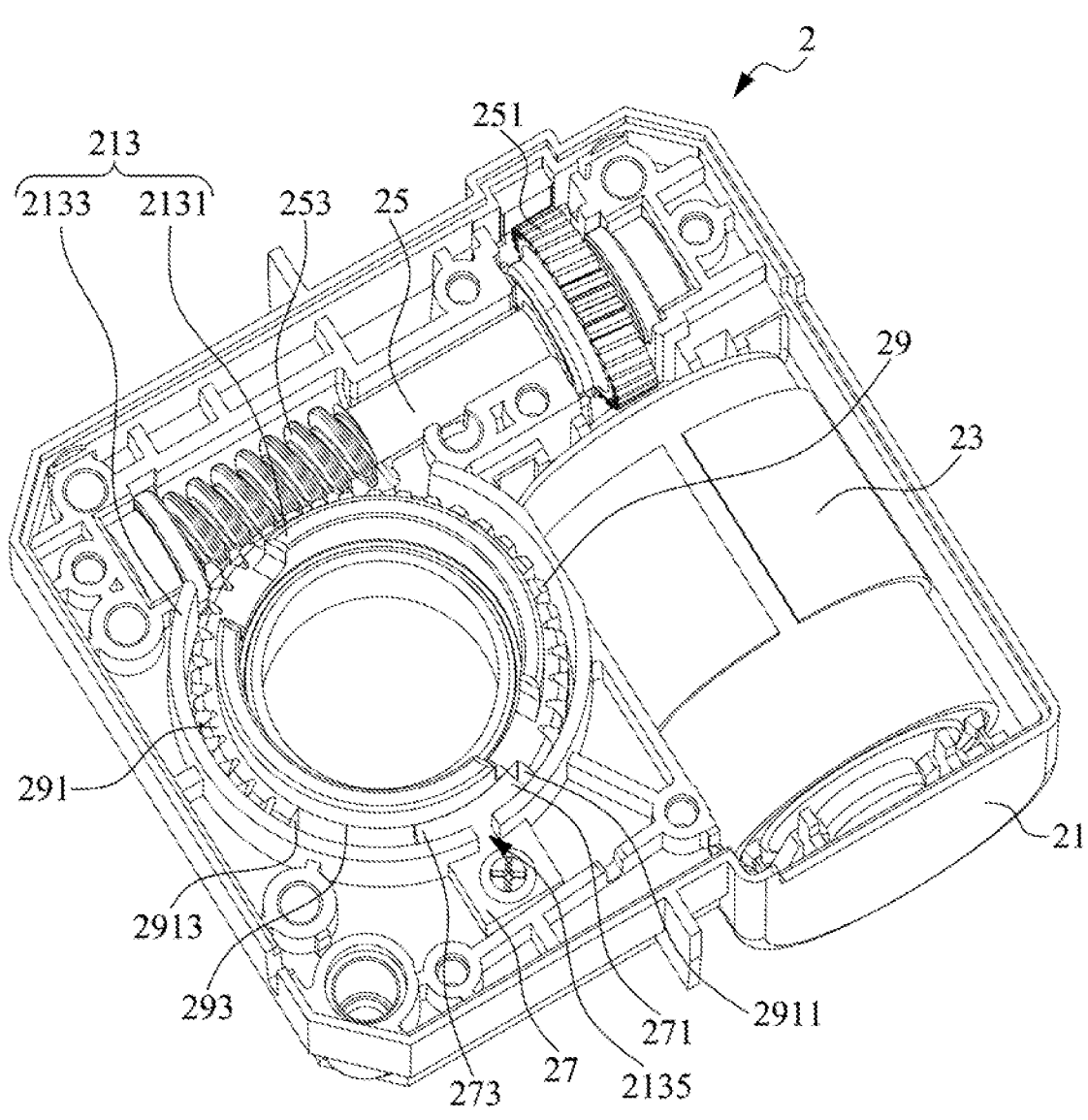
FIG. 3 is a perspective view of an actuator of an exterior rearview mirror assembly in accordance with an embodiment of the instant disclosure.

FIG. 1 is a schematic rear view of an exterior rearview mirror assembly 1 for a vehicle 11 in accordance with an embodiment of the instant disclosure. As shown in FIG. 1, the exterior rearview mirror assembly 1 for the vehicle 11 may include a mirror reflective element 12, a mirror head portion 14, a mounting portion 16 and an actuator 2 (FIGS. 2 and 3). The mirror reflective element 12 may be received in and/or supported by the mirror head portion. The mirror head portion 14 may be movably mounted to a mounting portion 16 via the actuator 2.

The mounting portion 16 may be mounted at a side 111 of the vehicle 11, and the mirror reflective element 12 may provide a rearward field of view along the respective side of the vehicle 11 to the driver of the vehicle 11. The actuator 2 may be received or disposed at least partially in mounting portion 16 (and/or at or at least partially in a side portion of the vehicle 11 and/or at or at least partially in the mirror head portion 14 of the exterior rearview mirror assembly 1) and is operable to pivot the mirror head portion 14 relative to the mounting portion 16 to adjust the mirror head portion 14 between a rearward viewing position or orientation, where the mirror head portion 14 and mirror reflective element 12 are positioned so as to provide a rearward field of view to the driver of the vehicle 11, and a folded or stowed position, where the mirror head portion 14 and mirror reflective element 12 are oriented generally along the side 111 of the vehicle 11.

The mounting portion 16 may be fixed to the side 111 of the vehicle and the mirror head portion 14 may be pivotally or adjustably disposed at an outer of the mounting portion 16. The mounting portion 16 may comprise a generally hollow portion or cavity for receiving the actuator 2 therein, and the mirror head portion 14 may be connected to the actuator 2 directly or indirectly.

In some embodiments of the present disclosure, the mirror reflective element 12 may be attached to a mounting surface of or at the mirror head portion 14. In some embodiments of the present disclosure, the mirror reflective element 12 may be received in or partially received in a receiving structure or bezel structure at the mirror head portion 14 (and may be attached at a mounting plate or backing plate that may be adjustably mounted or disposed in the mirror casing and that may be adjustable via a powered mirror reflective element adjustment actuator to allow for adjustment of the mirror reflective element 12 relative to the mirror casing to establish a desired rearward field of view to the driver of the vehicle), while remaining within the spirit and scope of the present invention. The mirror reflective element 12 may be adjustably mounted or supported at or in or partially in the mirror head portion 14, such as via a reflective element actuator or the like.

FIG. 2 is an exploded perspective view of the actuator 2 of the exterior rearview mirror assembly 1 in accordance with an embodiment of the instant disclosure. FIG. 3 is a top plan view of the actuator 2 of the exterior rearview mirror assembly 1 in accordance with an embodiment of the instant disclosure. The actuator 2 may be operable to pivot or adjust the mirror head portion 14 relative to the mounting portion 16 such that the mirror head portion 14 may be adjusted relative to mounting portion 16 about a generally vertical pivot axis. As shown in FIGS. 2 and 3, the actuator 2 may include a housing portion 21, a cover portion 22, a driving unit 23, a driving shaft 25, a bearing assembly 26, a limiting element 27 and an actuating gear element 29. The housing portion 21 and the cover portion 22 may be matched with each other and together form an outer casing of the actuator 2. The outer casing formed by the housing portion 21 and the cover portion 22 may be at least partially received in the mounting portion 16 and configured to house or support the driving unit 23, the driving shaft 25, the bearing assembly 26, the limiting element 27 and the actuating gear element 29. In some embodiments of the present disclosure, the housing portion 21 and the cover portion 22 may be configured or molded to provide an inner cavity for receiving the driving unit 23, the driving shaft 25, the bearing assembly 26, the limiting element 27 and the actuating gear element 29.

Referring to FIGS. 2 and 3, the housing portion 21 may include an inner space 211 for receiving the driving unit 23. In some embodiments of the present disclosure, the driving unit 23 may include a rotary motor. In some embodiments of the present disclosure, the driving unit 23 may consist of electrically powered motors, which can be connected to the vehicle's power source. This connection can be achieved through electrical leads of the motor that are connected to the vehicle wiring harness located at the side of the vehicle and at the mounting portion 16.

The driving unit 23 may include a rotationally driven output shaft 231 with a worm gear 233 attached to the output shaft 231. The driving shaft 25 may include a gear 251 and a worm gear 253. The gear 251 may be disposed to be adjacent to one end of the driving shaft 25 and the worm gear 253 may be disposed to be adjacent to an opposite end of the driving shaft 25. The teeth of the worm gear 233 of the driving unit 23 may engage the teeth of the gear 251 of the driving shaft 25. Once the driving unit 23 drives the worm gear 233 to rotate, it will cause the driving shaft 25 with the gear 251 meshing with the worm gear 233 to rotate. Further, the worm gear 253 attached to the opposite end of the driving shaft 25 may rotate accordingly.

Referring to FIG. 2, the housing portion 21 may include an axle portion 213, and the axle portion may include an inner wall 2131 and an outer wall 2133 which substantially surrounds the inner wall 2131. As shown in FIG. 2, the inner wall 2131 and the outer wall 2133 are spaced apart from each other, and thus a groove is formed between the inner wall 2131 and the outer wall 2133. The bearing assembly 26 and the actuating gear element 29 may be received in the groove formed between the inner wall 2131 and the outer wall 2133. That is, the actuating gear element 29 may be fitted onto the axle portion 213 of the housing portion 21 and rotatably supported (such as via the bearing assembly 26) at the housing portion 21.

In some embodiments of the present disclosure, the actuating gear element 29 may include a ring-shaped gear. In some embodiments of the present disclosure, the actuating gear element 29 may include a worm wheel. In some embodiments of the present disclosure, the actuating gear element 29 may include a partly tooth missing gear. That is, the actuating gear element 29 may include a teeth portion 291 and a missing teeth region 293. The teeth portion 291 may extend along a circumference of the actuating gear element 29 and include two end portions 2911 and 2913. The missing teeth region 293 may also extend along a circumference of the actuating gear element 29 and be located between the two end portions 2911 and 2913 of the teeth portion 291. Further, the teeth of the teeth portion 291 may engage the teeth of the worm gear 253 of the driving shaft 25. Thus, when the driving unit 23 drives the driving shaft 25 to rotate, the worm gear 253 of the driving shaft 25 may cause the actuating gear element 29 to rotate accordingly.

Moreover, the actuating gear element 29 may include an attaching portion 295 with a slot 2950. In some embodiments of the present disclosure, the mirror head portion 14 may be connected to the actuating gear element 29 through the attaching portion 295 and/or the slot 2950 of the attaching portion 295. In some embodiments of the present disclosure, the mirror head portion 14 may be connected to the actuating gear element 29 via an attaching means, and the attaching means may be fixedly attached at the attaching portion 295 and/or the slot 2950 of the attaching portion 295. That is, the rotation of the actuating gear element 29 may impart a corresponding rotation of mirror head portion 14 about the generally vertical axis of rotation and relative to the side 111 of the vehicle 11 equipped with the exterior rearview mirror assembly 1.

Referring to FIGS. 2 and 3, the limiting element 27 may be fixed to the housing portion 21 and adjacent to the actuating gear element 29. In some embodiments of the present disclosure, the limiting element 27 may be fixed to the housing portion 21 by a screw. The limiting element 27 may be disposed at the outer wall 2133 of the axle portion 213. In some embodiments of the present disclosure, the limiting element 27 may be received in a gap 2135 of the outer wall 2133 of the axle portion 213. As shown in FIG. 3, the limiting element 27 may be located to abut the circumference of the actuating gear element 29 and substantially align or correspond to the missing teeth region 293 of the actuating gear element 29. Further, the limiting element 27 may have wing portions 271 and 273. The wing portions 271, 273 may abut the missing teeth region 293 of the actuating gear element 29 and substantially extend along the circumference of the actuating gear element 29. The wing portion 271 of the limiting element 27 may substantially align the end portion 2911 of the teeth portion 291, and the wing portion 273 of the limiting element 27 may substantially align the end portion 2913 of the teeth portion 291.

As abovementioned, the cover portion 22 is configured to match the housing portion 21. In some embodiments of the present disclosure, the cover portion 22 may include a through hole 220. The mirror head portion 14 may be connected to the actuating gear element 29 of the actuator 2 through the through hole 220.

As abovementioned, when the driving unit 23 starts operating, it may drive the driving shaft 25 to rotate. The rotation of the driving shaft 25 may cause the actuating gear element 29 to rotate. Further, the actuating gear element 29 rotates, causing the mirror head portion 14 to rotate as well. This rotation may occur around the generally vertical axis of rotation and is relative to the side 111 of the vehicle 11 where the exterior rearview mirror assembly 1 is installed. When the actuating gear element 29 rotates and comes into contact with or engage with the limiting element 27, the wing portion 271, 273 of the limiting element 27 may push against the end portion 2911, 2913 of the teeth portion 291 of the actuating gear element 29, causing the actuating gear element 29 stop rotating.

Figure 4A:
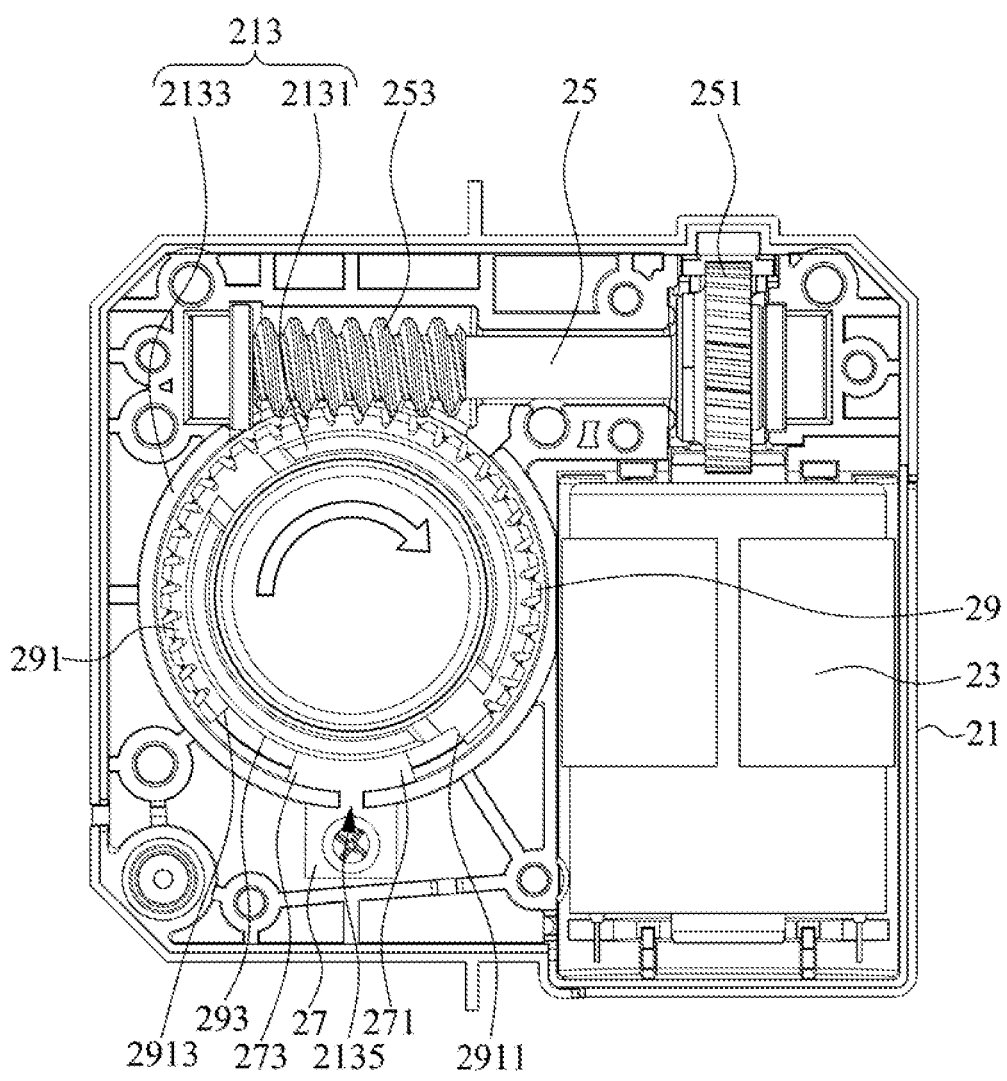
FIG. 4A shows an actuator of an exterior rearview mirror assembly in accordance with an embodiment of the instant disclosure, wherein the actuating gear element rotates in a clockwise direction.
Figure 5A:
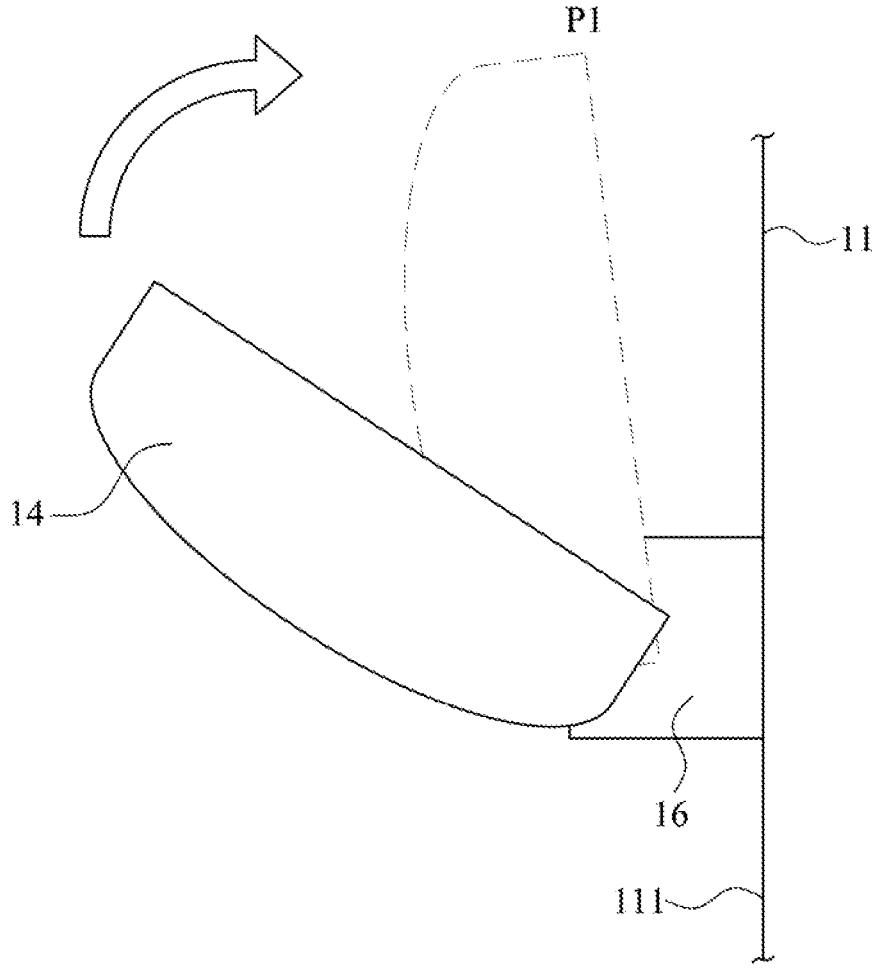
FIG. 5A shows an exterior rearview mirror assembly in accordance with an embodiment of the instant disclosure, wherein a mirror head portion rotates toward a folded position.

FIG. 4A shows a rotation of the actuating gear element 29. In some embodiments of the present disclosure, the driving unit 23 may drive the actuating gear element 29 to rotate in a clockwise direction (as shown in FIG. 4A). Further, the rotation of the actuating gear element 29 may impart a corresponding rotation of the mirror head portion 14 relative to the side 111 of the vehicle 11. In some embodiments of the present disclosure, the clockwise rotation of the actuating gear element 29 may gradually decrease an angle between the mirror head portion 14 and the side 111 of the vehicle 11. That is, the actuator 2 may drive the mirror head portion 14 to rotate toward a folded position P1 (referring to FIG. 5A).

Figure 4B:
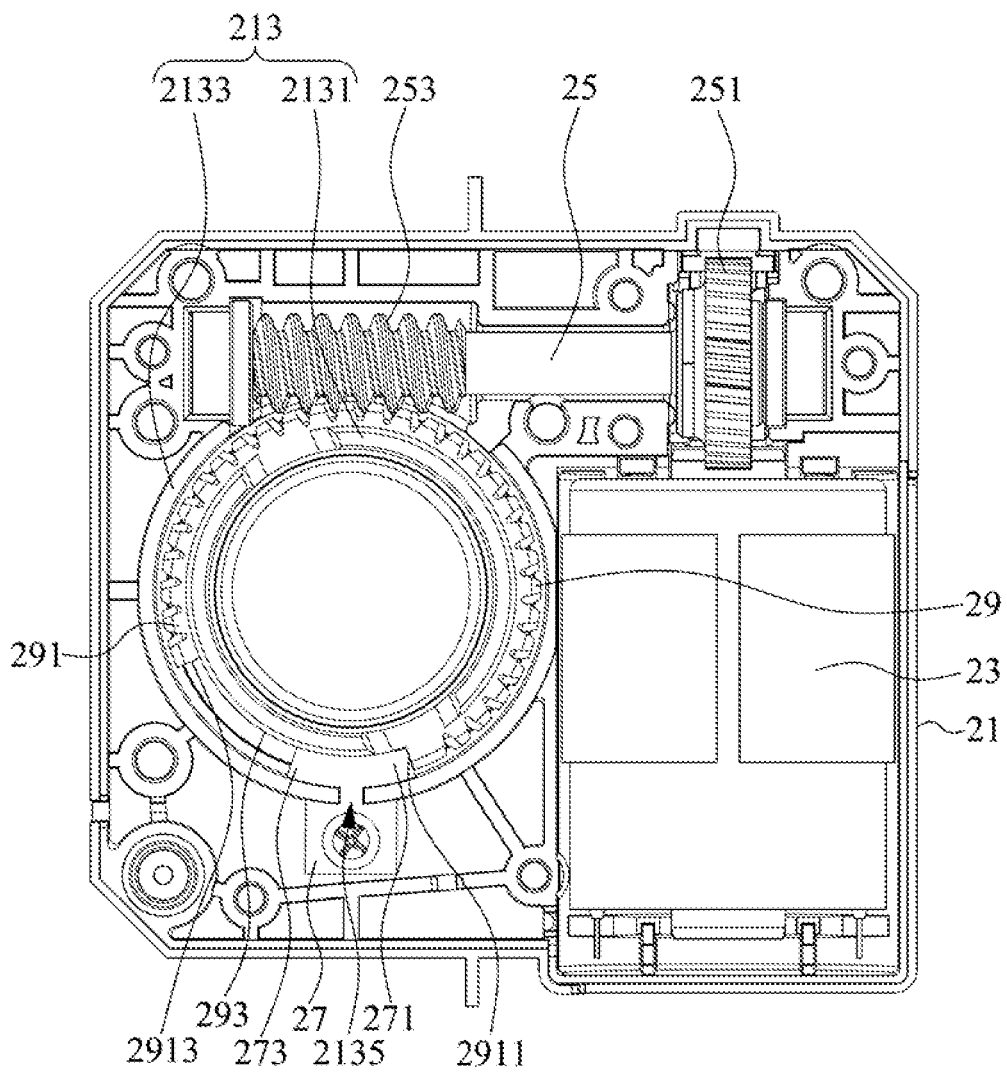
FIG. 4B shows an actuator of an exterior rearview mirror assembly in accordance with an embodiment of the instant disclosure, wherein a limiting element engages/contacts an actuating gear element.
Figure 5B:
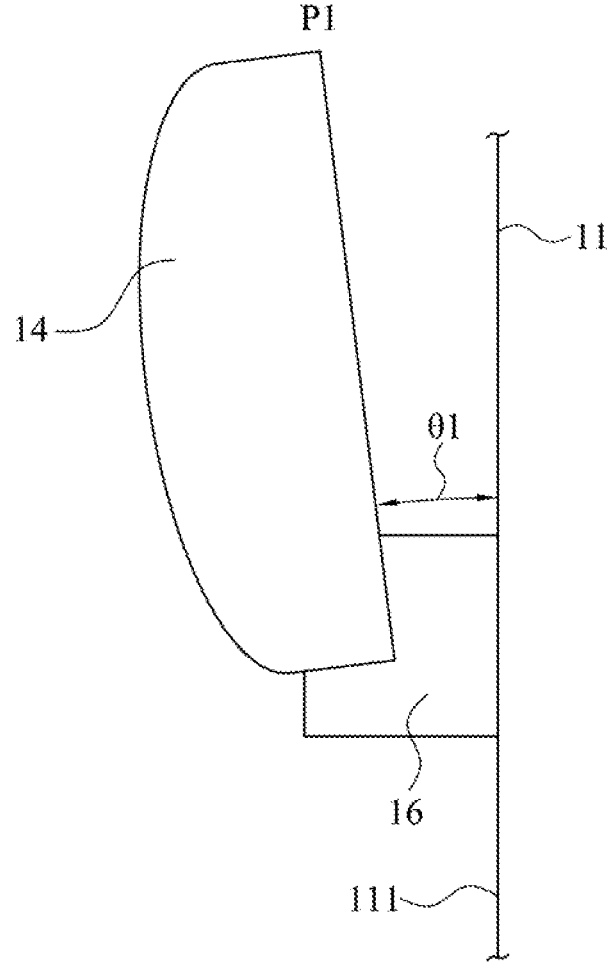
FIG. 5B shows an exterior rearview mirror assembly in accordance with an embodiment of the instant disclosure, wherein a mirror head portion is positioned at a predetermined minimum angle relative to a side of a vehicle.

Since the limiting element 27 may be fixed to the housing portion 21, there may be a relative movement between the limiting element 27 and the actuating gear element 29 when the actuating gear element 29 rotates. During the period when the actuator 2 drives the mirror head portion 14 to rotate towards the folded position P1, the limiting element 27 and the missing teeth region 293 of the actuating gear element 29 may move relative to each other, and the limiting element 27 may not block or affect the rotation of the actuating gear element 29. However, once the limiting element 27 comes into contact or engages with the actuating gear element 29, the actuating gear element will be restricted and stop rotating by the limiting element 27. As shown in FIG. 4B, the wing portion 271 of the limiting element 27 may be in contact with the end portion 2911 of the teeth portion 291 of the actuating gear element 29. When the wing portion 271 of the fixed limiting element 27 makes contact with the end portion 2911 of the teeth portion 291 of the actuating gear element 29, it may push against the end portion 2911, resulting in the cessation of rotation for the actuating gear element 29. Once the actuating gear element 29 stops rotating, the movement of the mirror head portion 14 may also come to a halt. In some embodiments of the present disclosure, the limiting element 27 is configured to engage with the actuating gear element 29 and stop its rotation when the mirror head portion is rotated to the folded position P1. That is, when the mirror head portion 14 rotates to be positioned at a predetermined minimum angle θ1 relative to the side 111 of the vehicle 11, the wing portion 271 of the limiting element 27 may contact and/or push against the end portion 2911 of the teeth portion 291 of the actuating gear element 29 so as to stop the rotation of the actuating gear element 29 (referring to FIG. 5B).

Figure 6A:
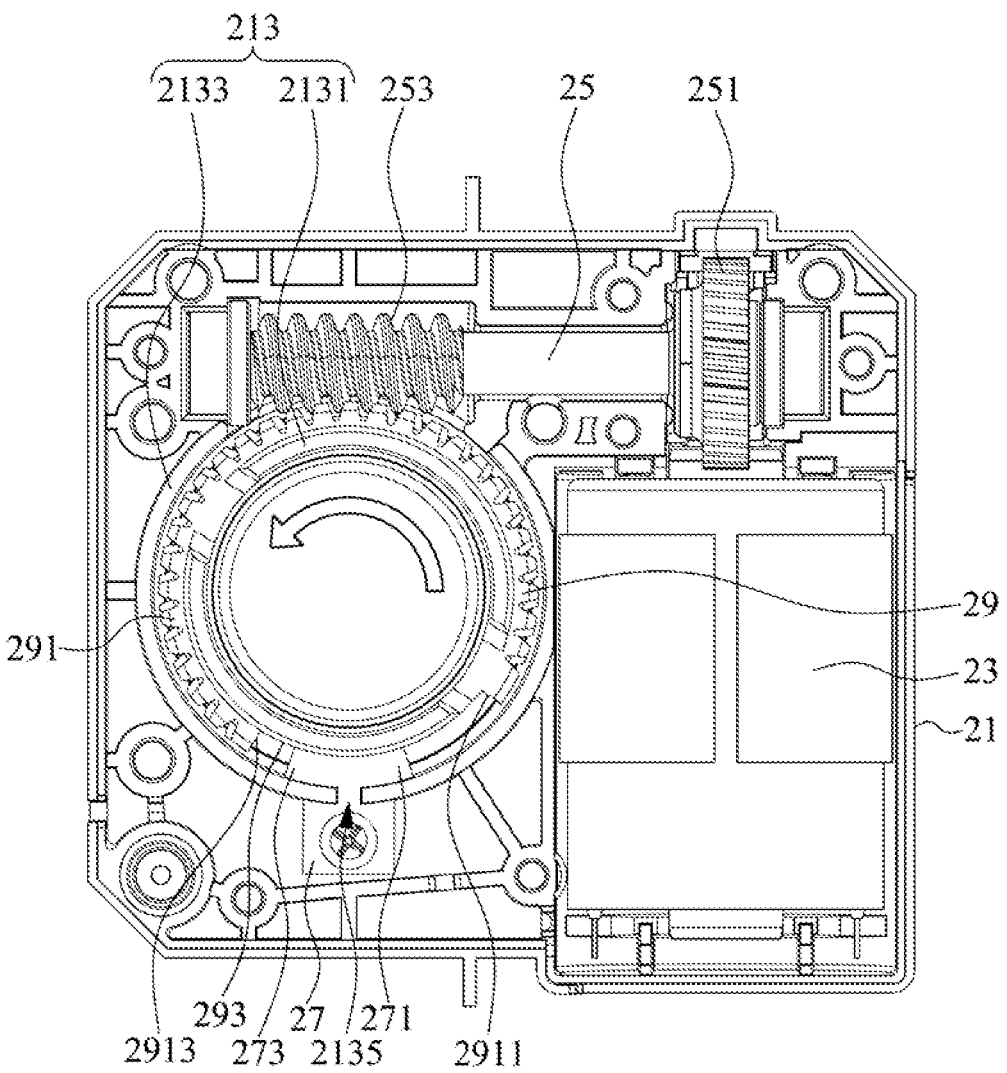
FIG. 6A shows an actuator of an exterior rearview mirror assembly in accordance with an embodiment of the instant disclosure, wherein the actuating gear element rotates in a counter-clockwise direction.
Figure 7A:
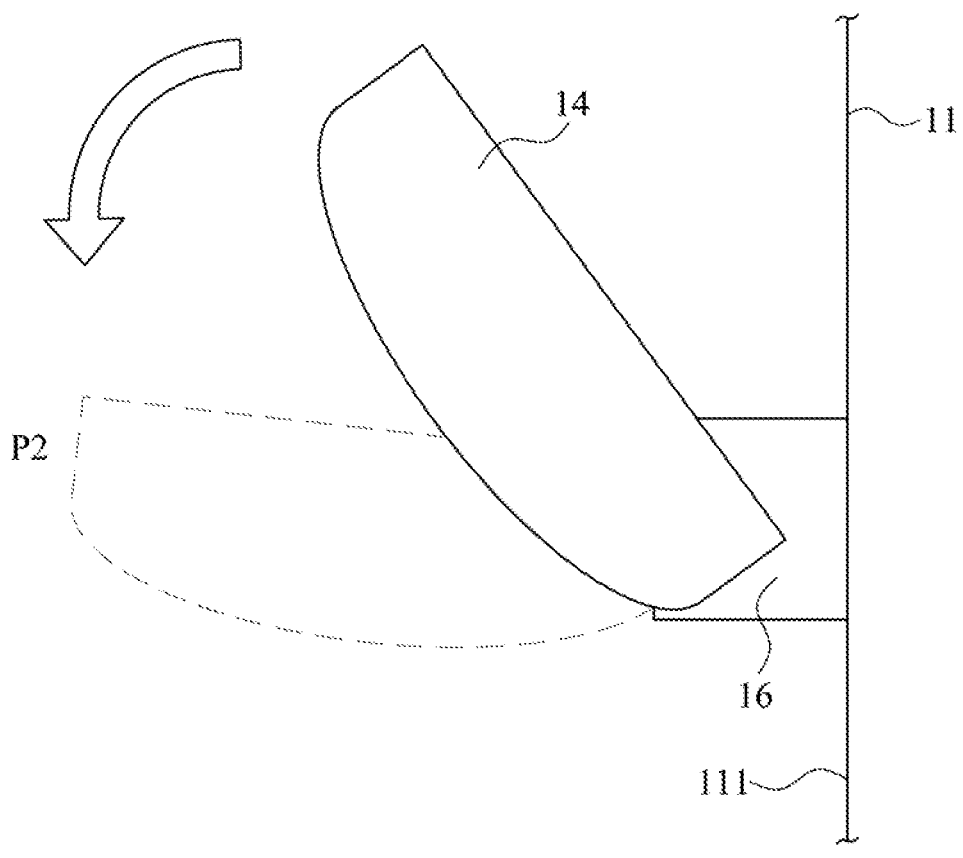
FIG. 7A shows an exterior rearview mirror assembly in accordance with an embodiment of the instant disclosure, wherein a mirror head portion rotates toward a use position.

FIG. 6A shows another rotation of the actuating gear element 29. In some embodiments of the present disclosure, the driving unit 23 may drive the actuating gear element 29 to rotate in a counterclockwise direction (as shown in FIG. 6A). Further, the rotation of the actuating gear element 29 may impart a corresponding rotation of the mirror head portion 14 relative to the side 111 of the vehicle 11. In some embodiments of the present disclosure, the counterclockwise rotation of the actuating gear element 29 may gradually increase the angle between the mirror head portion 14 and the side 111 of the vehicle 11. That is, the actuator 2 may drive the mirror head portion 14 to rotate toward a use position P2 (referring to FIG. 7A).

Figure 6B:
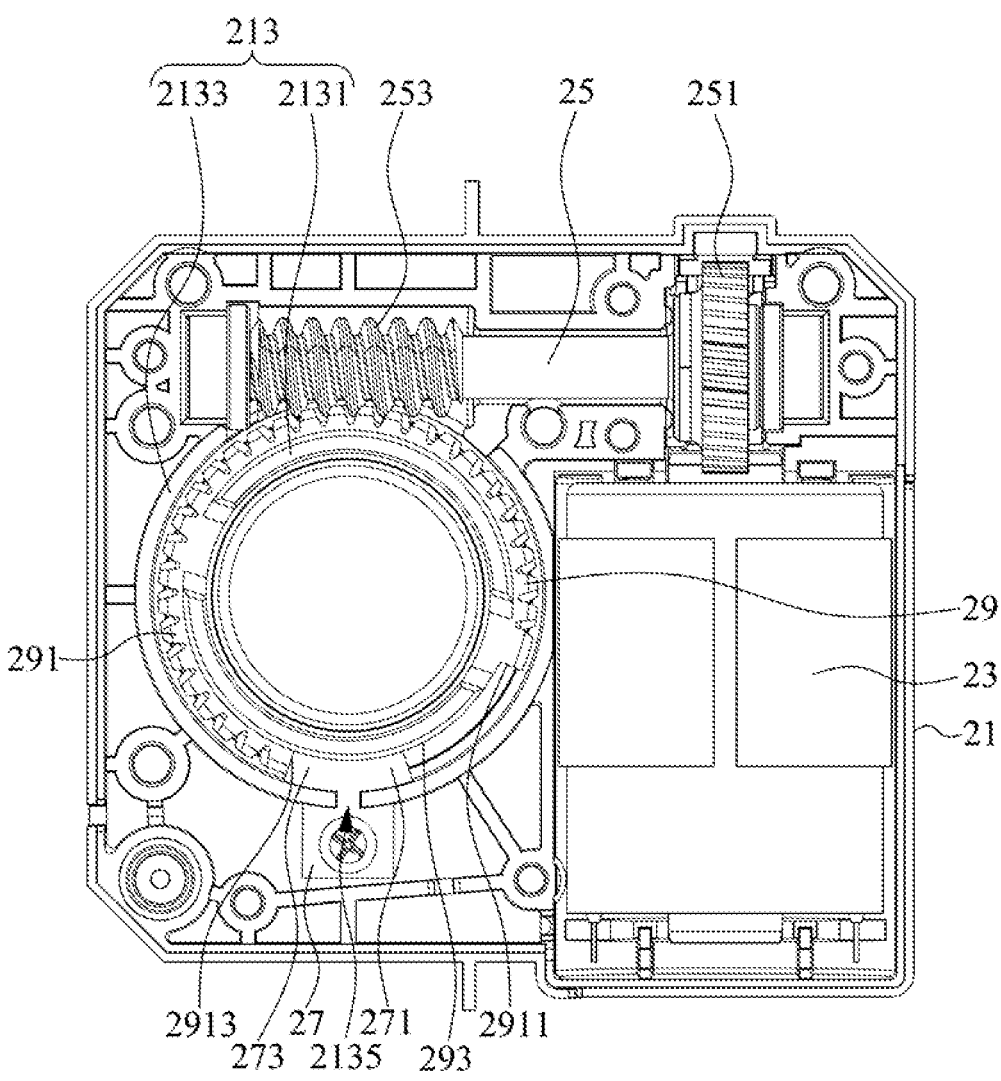
FIG. 6B shows an actuator of an exterior rearview mirror assembly in accordance with an embodiment of the instant disclosure, wherein a limiting element engages/contacts an actuating gear element.
Figure 7B:
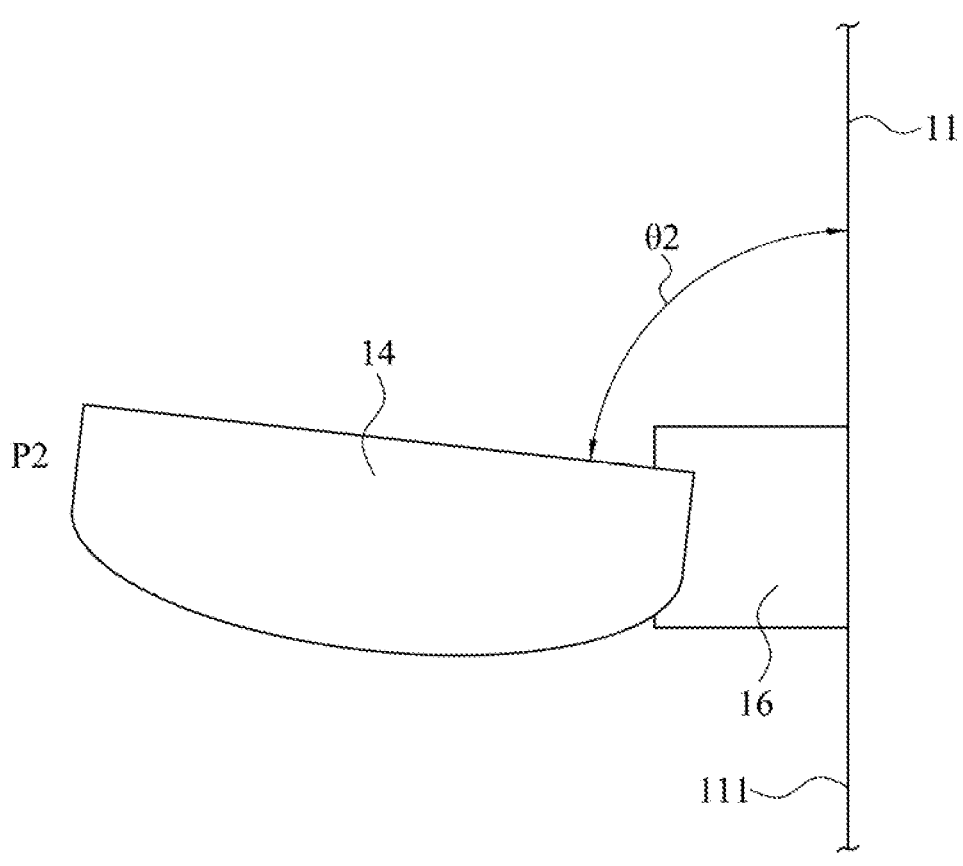
FIG. 7B shows an exterior rearview mirror assembly in accordance with an embodiment of the instant disclosure, wherein a mirror head portion is positioned at a predetermined maximum angle relative to a side of a vehicle.

As abovementioned, the limiting element 27 may be fixed to the housing portion 21, and thus there may be a relative movement between the limiting element 27 and the actuating gear element 29 when the actuating gear element 29 rotates. During the period when the actuator 2 drives the mirror head portion 14 to rotate towards the use position P2, the limiting element 27 and the missing teeth region 293 of the actuating gear element 29 may move relative to each other, and the limiting element 27 may not block or affect the rotation of the actuating gear element 29. However, once the limiting element 27 comes into contact or engages with the actuating gear element 29, the actuating gear element will be restricted and stop rotating by the limiting element 27. As shown in FIG. 6B, the wing portion 273 of the limiting element 27 may be in contact with the end portion 2913 of the teeth portion 291 of the actuating gear element 29. When the wing portion 273 of the fixed limiting element 27 makes contact with the end portion 2913 of the teeth portion 291 of the actuating gear element 29, it may push against the end portion 2913, resulting in the cessation of rotation for the actuating gear element 29. Once the actuating gear element 29 stops rotating, the movement of the mirror head portion 14 may also come to a halt. In some embodiments of the present disclosure, the limiting element 27 is configured to engage with the actuating gear element 29 and stop its rotation when the mirror head portion is rotated to the use position P2. That is, when the mirror head portion 14 rotates to be positioned at a predetermined maximum angle θ2 relative to the side 111 of the vehicle 11, the wing portion 273 of the limiting element 27 may contact and/or push against the end portion 2913 of the teeth portion 291 of the actuating gear element 29 so as to stop the rotation of the actuating gear element 29 (referring to FIG. 7B).

Figure 8:
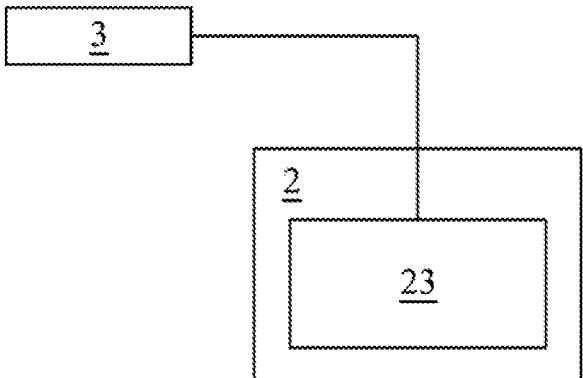
FIG. 8 is a block diagram of an actuator connected to a power-off circuit.

Referring to FIG. 8, the actuator 2 may be connected to a power-off circuit 3. In some embodiments of the present disclosure, the driving unit 23 of the actuator 2 may be electrically connected to the power-off circuit 3. When the limiting element 27 engages with actuating gear element 29 and causes the actuating gear element 29 to stop rotating, the rotation of the output shaft 231 of the driving unit 23 may be also restricted. However, the driving unit 23 may be still powered on at the moment, so the power to the motor must be cut off; otherwise, it will result in the driving unit 23 being burned out. The power-off circuit 3 may be connected in series with the power-off circuit 3. When the output shaft 231 of the driving unit 23 stops rotating, the current flowing through the power-off circuit 3 may increase. When the current flowing through the power-off circuit 3 exceeds a threshold value, the power will automatically be cut off to stop the driving unit 23 from working, achieving the purpose of protecting the driving unit 23.

Figure 9:
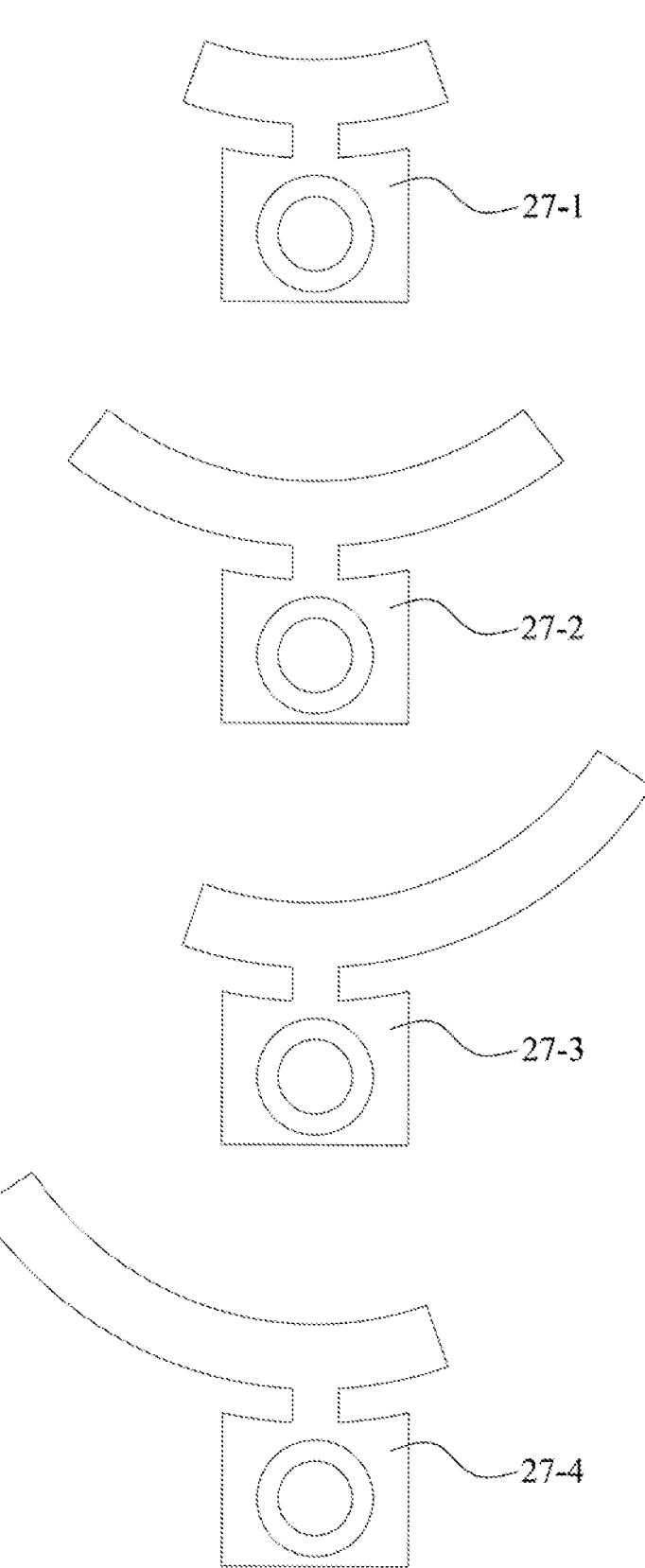
FIG. 9 shows various embodiments of a limiting element of an actuator.

As abovementioned, when the wing portion 271, 273 of the limiting element 27 pushes against the end portion 2911, 2913 of the teeth portion 291 of the actuating gear element 29, the limiting element 27 may restrict the rotation of the actuating gear element 29. That is, a length of the wing portion 271, 273 of the limiting element 27 may be closely related to the angle at which the actuating gear element 29 rotates. In other words, the predetermined minimum angle between the mirror head portion 14 and the side 111 of the vehicle 11 (the fold position of the mirror head portion 14) and predetermined maximum angle between the mirror head portion 14 and the side 111 of the vehicle 11 (the use position of the mirror head portion 14) may be determined by the length of the wing portion 271, 273 of the limiting element 27. FIG. 9 shows various embodiments of the limiting element 27-1, 27-2, 27-3, 27-4. As shown in FIG. 9, the limiting elements 27-1, 27-2, 27-3, 27-4 may have different lengths in their wing portions. Users can choose different limiting elements 27-1, 27-2, 27-3, 27-4 according to their needs.

Figure 10:
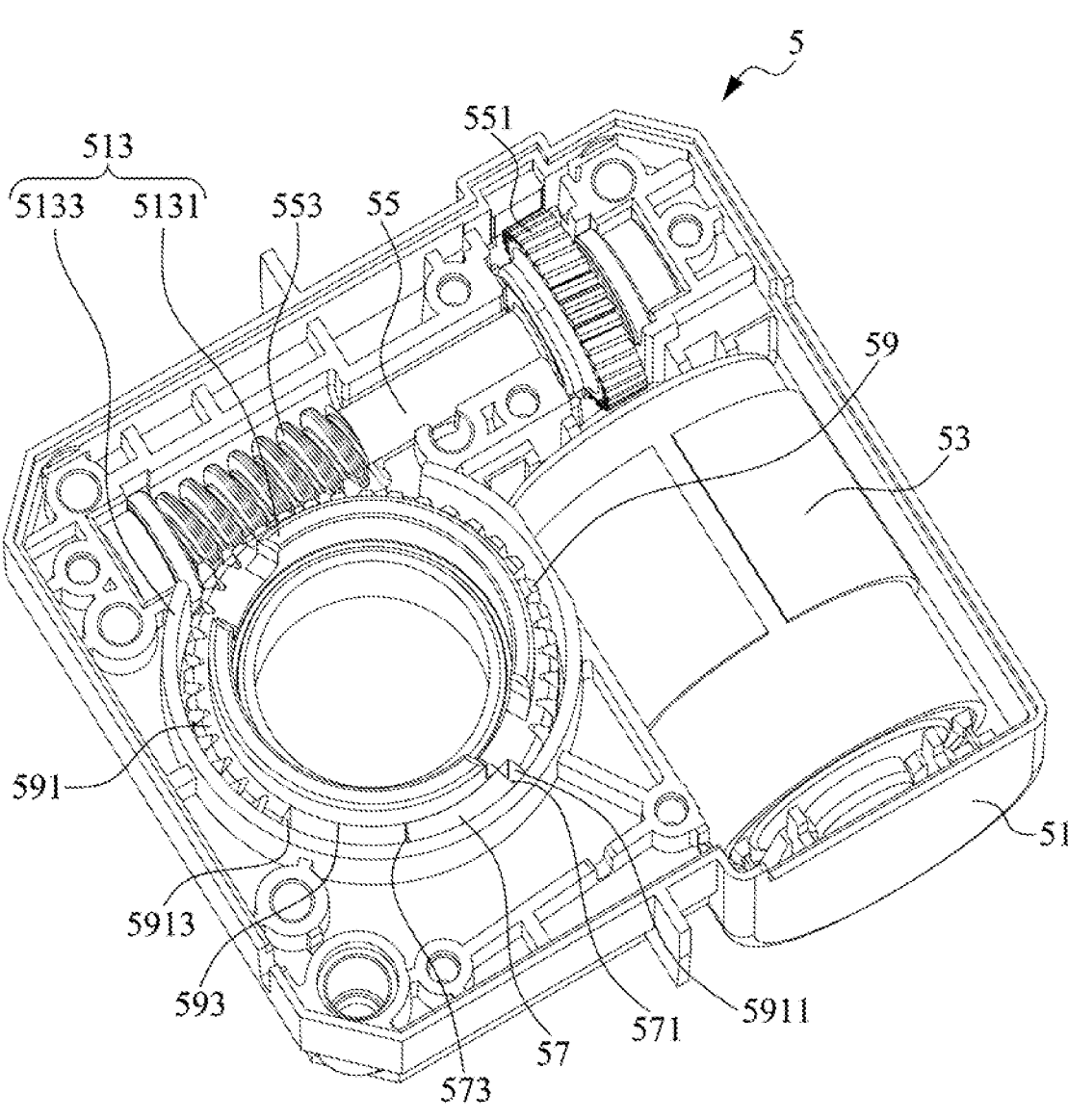
FIG. 10 shows a perspective view of an actuator of an exterior rearview mirror assembly in accordance with an embodiment of the instant disclosure.

FIG. 10 shows a perspective view of an actuator 5 of an exterior rearview mirror assembly in accordance with an embodiment of the instant disclosure. The functions of the actuator 5 and the actuator 2 may be either the same or similar to each other. The actuator 5 may be used in the exterior rearview mirror assembly 1 as well. As shown in FIG. 10, the actuator 5 may include a housing portion 51, a cover portion (not shown), a driving unit 53, a driving shaft 55, a bearing assembly (not shown), a limiting element 57 and an actuating gear element 59. The housing portion 51 is configured to receive the driving unit 53. The driving unit 53 may connect the driving shaft 55 and configured to drive the driving shaft 55 to rotate. The driving shaft 55 may include a gear connected to a worm gear arranged at the output shaft of the driving unit 53. Moreover, the driving shaft 55 may include a worm gear 553 connected to the actuating gear element 59.

The actuating gear element 59 may include a teeth portion 591 and a missing teeth region 593. The teeth portion 591 may extend along a circumference of the actuating gear element 59 and include two end portions 5911 and 5913. The missing teeth region 593 may also extend along a circumference of the actuating gear element 59 and be located between the two end portions 5911 and 5913 of the teeth portion 591. The teeth of the teeth portion 591 may engage the teeth of the worm gear 553 of the driving shaft 55. Thus, when the driving unit 53 drives the driving shaft 55 to rotate, the worm gear 553 of the driving shaft 55 may cause the actuating gear element 59 to rotate accordingly.

The housing portion 51 may include an axle portion 513, and the axle portion may include an inner wall 5131 and an outer wall 5133 which substantially surrounds the inner wall 5131. The actuating gear element 59 may be received in a groove formed between the inner wall 5131 and the outer wall 5133. That is, the actuating gear element 59 may be fitted onto the axle portion 513 of the housing portion 51.

The limiting element 57 may be fixed to the housing portion 51 and adjacent to the actuating gear element 59. As shown in FIG. 10, the limiting element 57 may be disposed on an inner surface of the outer wall 5135 of the axle portion 513. In some embodiments of the present disclosure, the limiting element 57 may be integrally formed with the outer wall 5135 of the axle portion 513. Referring to FIG. 10, the limiting element 57 may be located to abut the circumference of the actuating gear element 59 and substantially align or correspond to the missing teeth region 593 of the actuating gear element 59. Further, the limiting element 57 may substantially extend along the circumference of the actuating gear element 59. The limiting element 57 may have end portions 571 and 573. The end portion 571 of the limiting element 57 may substantially align the end portion 5911 of the teeth portion 591, and the end portion 573 of the limiting element 57 may substantially align the end portion 5913 of the teeth portion 591. That is, when the actuating gear element 59 rotates and comes into contact with or engage with the limiting element 57, the end portion 571, 573 of the limiting element 57 may push against the end portion 5911, 5913 of the teeth portion 591 of the actuating gear element 59, causing the actuating gear element 59 stop rotating.

It will be appreciated that in the forgoing apparatus, the actuator for the exterior rearview mirror assembly for the vehicle provides a limiting element configured to restrict a rotation of the actuating gear element of the actuator, which may be connected to the mirror head portion. The limiting element may have a small size and be positioned to be adjacent to the actuating gear element. The structure of this limiting element can save the manufacturing cost of the actuator and significantly reduce the overall size and weight of the actuator.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An exterior rearview mirror assembly for a vehicle, comprising
a mounting portion mountable at a side of the vehicle;
a mirror head portion adjustably mounted at said mounting portion;
a reflective element at said mirror head portion; and
an actuator operable to impart pivotal movement of said mirror head portion relative to said mounting portion;
wherein the actuator comprises:
a gear element having a teeth portion and a missing teeth region,
a driving unit configured to drive the gear element to pivot said mirror head portion relative to said mounting portion; and
a limiting element located to corresponding to the missing teeth region and configured to engage with the teeth portion in order to prevent the gear element from causing any pivoting movement between the mirror head portion and the mounting portion,
wherein the actuator comprises an axle portion configured to receive the gear element, and wherein the limiting element is disposed at the axle portion, and wherein the axle portion has an inner wall and an outer wall and the gear element is disposed in a groove between the inner wall and the outer wall, and wherein the limiting element is disposed at the outer wall of the axle portion.

2. The exterior rearview mirror assembly of claim 1, wherein the missing teeth region is configured to move relative to the limiting element when the driving unit drives the gear element.

3. The exterior rearview mirror assembly of claim 1, wherein the missing teeth region is adjacent to the teeth portion and substantially extends along a circumferential direction of the gear element.

4. The exterior rearview mirror assembly of claim 3, wherein the missing teeth region extends from a first end of the teeth portion to a second end of the teeth portion.

5. The exterior rearview mirror assembly of claim 4, wherein the mirror head portion rotates to be positioned at a predetermined minimum angle relative to the side of the vehicle when the limiting element contacts the first end of the teeth portion, and wherein the mirror head portion rotates to be positioned at a predetermined maximum angle relative to the side of the vehicle when the limiting element contacts the second end of the teeth portion.

6. The exterior rearview mirror assembly of claim 1, wherein the outer wall of the axle portion has a gap and the limiting element is disposed in the gap of the outer wall of the axle portion.

7. The exterior rearview mirror assembly of claim 1, wherein the limiting element is integrally formed with the outer wall of the axle portion.

8. An actuator for an exterior rearview mirror assembly for a vehicle, comprising:
a gear element;
a driving unit configured to impart a rotation of the gear element; and
a limiting element adjacent to a circumference of the gear element;
wherein the gear element has a teeth portion with a first end and a second end and the teeth portion extends along the circumference of the gear element;
wherein the limiting element leans against the first end or the second end of the teeth portion when the driving unit drives the gear element to rotate by an angle,
wherein the limiting element is disposed between the first end and the second end of the teeth portion, and wherein the limiting element has a wing portion extending along the circumference of the gear element and configured to come into contact with the first end or the second end of the teeth portion when the driving unit drives the gear element to rotate by the angle.

9. The actuator of claim 8, wherein a portion of the circumference of the gear element, which extends from the first end to the second end of the teeth portion, is free of teeth.

10. The actuator of claim 8, wherein a length of the wing portion of the limiting element is related to the angle.

11. The actuator of claim 8, wherein the gear element is received in an axle portion of the actuator; and wherein the limiting element is disposed at the axle portion of the actuator.

12. The actuator of claim 11, wherein the limiting element is fixed to an outer wall of the axle portion, and wherein the outer wall of the axle portion at least partially surrounds the gear element.

13. The actuator of claim 12, wherein the limiting element is formed with the outer wall of the axle portion.

\* \* \* \* \*